(12) United States Patent
He et al.

(10) Patent No.: US 11,190,575 B2
(45) Date of Patent: Nov. 30, 2021

(54) INFORMATION SHARING METHOD AND APPARATUS

(71) Applicant: Huawei Technologies Co., Ltd., Shenzhen (CN)

(72) Inventors: Liping He, Shanghai (CN); Gang Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 324 days.

(21) Appl. No.: 15/551,241

(22) PCT Filed: Feb. 15, 2015

(86) PCT No.: PCT/CN2015/073123
§ 371 (c)(1),
(2) Date: Aug. 15, 2017

(87) PCT Pub. No.: WO2016/127438
PCT Pub. Date: Aug. 18, 2016

(65) Prior Publication Data
US 2018/0034891 A1 Feb. 1, 2018

(51) Int. Cl.
*H04L 29/08* (2006.01)
*H04L 12/58* (2006.01)

(52) U.S. Cl.
CPC .............. *H04L 67/06* (2013.01); *H04L 29/08* (2013.01); *H04L 51/10* (2013.01); *H04L 67/18* (2013.01)

(58) Field of Classification Search
CPC .................................. H04L 67/06; H04L 51/10
USPC ......................................................... 709/204
See application file for complete search history.

(56) References Cited

U.S. PATENT DOCUMENTS

| 2011/0211534 A1 | 9/2011 | Schmidt et al. |
| 2012/0050004 A1* | 3/2012 | Curtis ............... G06F 40/103 340/5.2 |
| 2012/0054011 A1 | 3/2012 | Petersen et al. |
| 2012/0258726 A1 | 10/2012 | Bansal et al. |

(Continued)

FOREIGN PATENT DOCUMENTS

| CN | 1794832 A | 6/2006 |
| CN | 101309451 A | 11/2008 |

(Continued)

*Primary Examiner* — Wing F Chan
*Assistant Examiner* — Leon Y Tseng
(74) *Attorney, Agent, or Firm* — Leydig, Voit & Mayer, Ltd.

(57) ABSTRACT

Embodiments of the present invention relate to an information sharing method and apparatus. The method includes: sharing, by a first terminal, specified content with a specified sharing user when a preset sharing condition is met, where the sharing condition is at least one of the following factors: a current time of the first terminal is a preset time; a current time of the first terminal falls within a preset time range; a current geographic location of the first terminal is a preset geographic location; or a current geographic location of the first terminal falls within a preset geographic location range. According to the present invention, a sharing condition such as a time or a geographic location is preset, and content is shared with a specified user according to the sharing condition, thereby simplifying complexity of sharing information in a future time period and improving usability of information sharing.

4 Claims, 1 Drawing Sheet

---

A first terminal shares specified content with a specified sharing user when a preset sharing condition is met, where the sharing condition is at least one of the following factors: a current time of the first terminal is a preset time; a current time of the first terminal falls within a preset time range; a current geographic location of the first terminal is a preset geographic location; or a current geographic location of the first terminal falls within a preset geographic location range

110

(56) References Cited

U.S. PATENT DOCUMENTS

| | | | |
|---|---|---|---|
| 2015/0026275 A1 | 1/2015 | Zhang | |
| 2015/0026595 A1* | 1/2015 | Lu | H04L 65/403 |
| | | | 715/753 |
| 2015/0112999 A1* | 4/2015 | Sivasubramanian | |
| | | | H04L 67/1097 |
| | | | 707/741 |
| 2015/0304437 A1* | 10/2015 | Vaccari | G06F 16/9537 |
| | | | 709/204 |
| 2016/0149850 A1* | 5/2016 | Pan | H04L 67/22 |
| | | | 709/206 |
| 2017/0230114 A1* | 8/2017 | Kim | H04B 10/1143 |
| 2018/0181603 A1* | 6/2018 | Mishra | G06F 16/9535 |

FOREIGN PATENT DOCUMENTS

| | | |
|---|---|---|
| CN | 101365179 A | 2/2009 |
| CN | 101754125 A | 6/2010 |
| CN | 101816014 A | 8/2010 |
| CN | 102546835 A | 7/2012 |
| CN | 102857402 A | 1/2013 |
| CN | 103037007 A | 4/2013 |
| CN | 103312755 A | 9/2013 |
| CN | 103905552 A | 7/2014 |
| CN | 104202396 A | 12/2014 |
| WO | 2009074066 A1 | 6/2009 |

\* cited by examiner

A first terminal shares specified content with a specified
sharing user when a preset sharing condition is met, where the
sharing condition is at least one of the following factors: a
current time of the first terminal is a preset time; a current time
of the first terminal falls within a preset time range; a current
geographic location of the first terminal is a preset geographic
location; or a current geographic location of the first terminal
falls within a preset geographic location range       110

FIG. 1

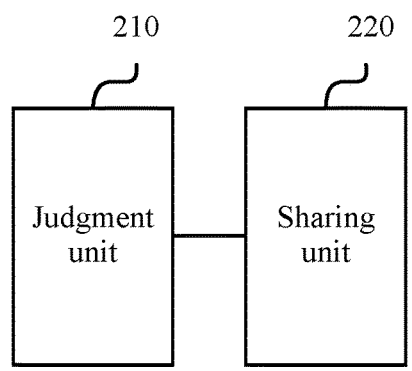

FIG. 2

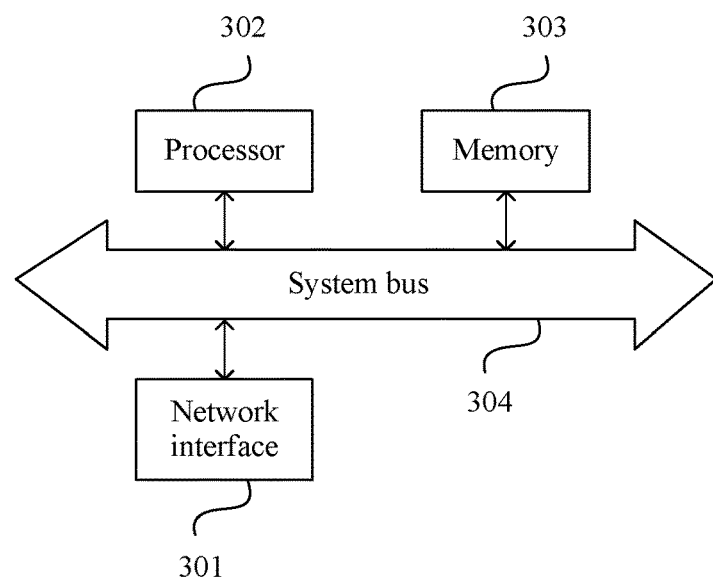

FIG. 3

INFORMATION SHARING METHOD AND APPARATUS

CROSS-REFERENCE TO RELATED APPLICATIONS

This application is a National Stage of International Application No. PCT/CN2015/073123, filed on Feb. 15, 2015, which is hereby incorporated by reference in its entirety.

TECHNICAL FIELD

The present invention relates to the field of network technologies, and in particular, to an information sharing method and apparatus.

BACKGROUND

The modern Internet including the mobile Internet is well developed. Sharing information with a friend by using a network is a very common behavior.

In the prior art, generally, when information is shared with a specified person or some persons, the shared information can only take effect immediately, that is, the information can be viewed provided that a user performs refreshing. However, some information cannot effectively express a sharer's meaning at a current time point or a current location, and effect is poor. For example, a picture about happy birthday is shared with a friend, but that time is not the birthday of the friend. In addition, if a person wants to receive sharing from a friend within a specific future time period, for example, a photograph, the person needs to first notify the friend, and after shooting a photograph in the time period and getting the photograph ready, the friend shares the photograph. This process has cumbersome steps, and in a specified future time period, the friend may forget to create to-be-shared content, or cannot immediately execute sharing in a timely manner at a future moment.

SUMMARY

Embodiments of the present invention provide an information sharing method and apparatus. A sharing condition such as a time or a geographic location is preset, and content is shared with a specified user according to the sharing condition, thereby simplifying complexity of sharing information in a future time period and improving usability of information sharing.

According to a first aspect, the present invention provides an information sharing method, including:

sharing, by a first terminal, specified content with a specified sharing user when a preset sharing condition is met, where the sharing condition is at least one of the following factors: a current time of the first terminal is a preset time; a current time of the first terminal falls within a preset time range; a current geographic location of the first terminal is a preset geographic location; or a current geographic location of the first terminal falls within a preset geographic location range.

With reference to the first aspect, in a first implementation manner of the first aspect, the method further includes:

determining, by the first terminal, the preset sharing condition, the specified content, and the specified sharing user according to a sharing request from a second terminal.

With reference to the first aspect or the first implementation manner of the first aspect, in a second implementation manner, the specified content specifically includes:

at least one piece of the following content stored on the first terminal or a specified server: content in a specified storage path; a file of a specified type; a file with a specified generation time; a file with a specified name; or a file that has a specified geographic location attribute.

With reference to the first aspect, the first implementation manner of the first aspect, or the second implementation manner of the first aspect, in a third implementation manner, the sharing specified content with a specified sharing user specifically includes:

sending, by the first terminal, the specified content and the specified sharing user to the specified server when the preset sharing condition is met, so that the server sends the specified content to the specified sharing user; or sending, by the first terminal, the preset sharing condition, the specified content, and the specified sharing user to the specified server, so that the server sends the specified content to the specified sharing user when the preset sharing condition is met.

According to a second aspect, the present invention provides an information sharing apparatus, where the apparatus includes a judgment unit and a sharing unit, where the judgment unit is configured to determine whether a preset sharing condition is met; and the sharing unit is configured to share specified content with a specified sharing user when the preset sharing condition is met, where the sharing condition is at least one of the following factors: a current time is a preset time; a current time falls within a preset time range; a current geographic location is a preset geographic location; or a current geographic location falls within a preset geographic location range.

With reference to the second aspect, in a first implementation manner of the second aspect, the apparatus further includes a determining unit, where the determining unit is configured to determine the preset sharing condition, the specified content, and the specified sharing user according to a sharing request from a second terminal.

With reference to the second aspect or the first implementation manner of the second aspect, in a second implementation manner, the specified content specifically includes:

at least one piece of the following content stored on the first terminal or a specified server: content in a specified storage path; a file of a specified type; a file with a specified generation time; a file with a specified name; or a file that has a specified geographic location attribute.

With reference to the second aspect, the first implementation manner of the second aspect, or the second implementation manner of the second aspect, in a third implementation manner, the sharing unit is specifically configured to:

send the specified content and the specified sharing user to the specified server when the preset sharing condition is met, so that the server sends the specified content to the specified sharing user; or send the preset sharing condition, the specified content, and the specified sharing user to the specified server, so that the server sends the specified content to the specified sharing user when the preset sharing condition is met.

According to a third aspect, the present invention provides an information sharing apparatus, where the apparatus includes:

a network interface;

a processor;

a memory; and an application program physically stored in the memory, where the application program includes instructions that can be used to enable the processor and the system to execute the following process:

sharing specified content with a specified sharing user when a preset sharing condition is met, where the sharing condition is at least one of the following factors: a current time of the first terminal is a preset time; a current time of the first terminal falls within a preset time range; a current geographic location of the first terminal is a preset geographic location; or a current geographic location of the first terminal falls within a preset geographic location range.

The embodiments of the present invention provide an information sharing method and apparatus. A sharing condition such as a time or a geographic location is preset, and content is shared with a specified user according to the sharing condition, thereby simplifying complexity of sharing information in a future time period and improving usability of information sharing.

BRIEF DESCRIPTION OF DRAWINGS

FIG. 1 is a flowchart of an information sharing method according to a first embodiment of the present invention;

FIG. 2 is a schematic diagram of an information sharing apparatus according to a second embodiment of the present invention; and FIG. 3 is a schematic diagram of an information sharing apparatus according to a third embodiment of the present invention.

DESCRIPTION OF EMBODIMENTS

Technical solutions of the present invention are further described in detail with reference to accompanying drawings and embodiments as follows:

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A method provided in the present invention is applicable to a scenario in which user equipment is connected to a network. In the following embodiments, the user equipment may be a mobile phone, a tablet computer, or the like. A network environment is described by using a mobile data network (which includes 2G, 3G, 4G, 5G, or the like) or a WiFi network as an example.

FIG. 1 is a flowchart of an information sharing method according to a first embodiment of the present invention. As shown in FIG. 1, the method includes the following step:

S110. A first terminal shares specified content with a specified sharing user when a preset sharing condition is met.

The sharing condition is at least one of the following factors: a current time of the first terminal is a preset time; a current time of the first terminal falls within a preset time range; a current geographic location of the first terminal is a preset geographic location; or a current geographic location of the first terminal falls within a preset geographic location range.

Specifically, a sharing condition is preset on the first terminal, and the sharing condition is at least one of the following factors: a current time of the first terminal is a preset time; a current time of the first terminal falls within a preset time range; a current geographic location of the first terminal is a preset geographic location; or a current geographic location of the first terminal falls within a preset geographic location range. The first terminal shares the specified content with the specified sharing user when the preset sharing condition is met.

For example, if the preset time is Jun. 7, 2015, and the preset geographic location range is from longitude 118°01' to 118°17' east and from latitude 30°01' to 30°18' north, the first terminal shares the specified content with the specified sharing user when the preset sharing condition is met.

It should be noted that the first terminal needs to have a Global Positioning System (GPS). The first terminal obtains information about the current geographic location by using the GPS. If the current geographic location meets the preset geographic location or falls within the preset geographic location range, the first terminal shares the specified content with the specified sharing user.

Further, the method further includes:

The first terminal determines the preset sharing condition, the specified content, and the specified sharing user according to a sharing request from a second terminal.

Specifically, the second terminal sends the sharing request to the first terminal to request the first terminal to send the specified content to the second terminal. In this case, the first terminal determines the sharing condition, the specified content, and the specified sharing user according to the sharing request of the second terminal, and sends the specified content that meets the sharing condition to the specified sharing user.

Optionally, the specified content specifically includes:

at least one piece of the following content stored on the first terminal or a specified server: content in a specified storage path; a file of a specified type; a file with a specified generation time; a file with a specified name; or a file that has a specified geographic location attribute.

The specified content may be the content that is stored on the first terminal or that is stored on the specified server: the content in a specified storage path; the file of a specified type, where for example, a specified file type is a picture, audio, or a video; the file with a specified generation time, for example, an audio file generated during a meeting held from time xx to time xx, date xx, month xx, and year xxxx; the file with a specified name or a file with a specified folder name; or the file that has a specified geographic location attribute, for example, a photograph shot at the Summer Palace.

Optionally, the sharing specified content with a specified sharing user specifically includes:

sending, by the first terminal, the specified content and the specified sharing user to the specified server when the preset sharing condition is met, so that the server sends the specified content to the specified sharing user; or sending, by the first terminal, the preset sharing condition, the specified content, and the specified sharing user to the specified server, so that the server sends the specified content to the specified sharing user when the preset sharing condition is met.

Specifically, the first terminal presets the sharing condition, the specified content, and the specified sharing user. The first terminal determines whether the sharing condition is met. The first terminal sends the specified content and the specified sharing user to the specified server when the first terminal determines that the sharing condition is met, and the server sends the specified content to the specified sharing user.

Alternatively, the first terminal presets the sharing condition, the specified content, and the specified sharing user, and sends the preset sharing condition, the specified content, and the specified sharing user to the specified server. The server determines whether the sharing condition is met. The server sends the specified content to the specified sharing user when the sharing condition is met.

This embodiment of the present invention provides an information sharing method. According to the method, a sharing condition such as a time or a geographic location is preset, and content is shared with a specified user according to the sharing condition, thereby simplifying complexity of sharing information in a future time period and improving usability of information sharing.

FIG. 2 is a schematic diagram of an information sharing apparatus according to a second embodiment of the present invention, so as to implement the method in the foregoing first embodiment. As shown in FIG. 2, the apparatus includes a judgment unit 210 and a sharing unit 220.

The judgment unit 210 is configured to determine whether a preset sharing condition is met.

The sharing unit 220 is configured to share specified content with a specified sharing user when the preset sharing condition is met.

The sharing condition is at least one of the following factors: a current time is a preset time; a current time falls within a preset time range; a current geographic location is a preset geographic location; or a current geographic location falls within a preset geographic location range.

Optionally, the apparatus further includes a determining unit 230.

The determining unit 230 is configured to determine the preset sharing condition, the specified content, and the specified sharing user according to a sharing request from a second terminal.

Optionally, the specified content specifically includes:

at least one piece of the following content stored on the information sharing apparatus or a specified server: content in a specified storage path; a file of a specified type; a file with a specified generation time; a file with a specified name; or a file that has a specified geographic location attribute.

Optionally, the sharing unit 220 is specifically configured to:

send the specified content and the specified sharing user to the specified server when the preset sharing condition is met, so that the server sends the specified content to the specified sharing user; or send the preset sharing condition, the specified content, and the specified sharing user to the specified server, so that the server sends the specified content to the specified sharing user when the preset sharing condition is met.

Functions of the foregoing units may be corresponding to the processing step of the information sharing method described in the first embodiment. Details are not described herein.

This embodiment of the present invention provides an information sharing apparatus. A sharing condition such as a time or a geographic location is preset, and content is shared with a specified user according to the sharing condition, thereby simplifying complexity of sharing information in a future time period and improving usability of information sharing.

FIG. 3 is a schematic diagram of an information sharing apparatus according to a third embodiment of the present invention. As shown in FIG. 3, the information sharing apparatus includes a network interface 301, a processor 302, and a memory 303. A system bus 304 is configured to connect the network interface 301, the processor 302, and the memory 303.

The network interface 301 is configured to communicate with a terminal of the Internet of Things, an access gateway of the Internet of Things, a bearer network, a serving gateway of the Internet of Things, and an application server.

The memory 303 may be a permanent memory, for example, a hard disk drive and a flash memory, and the memory 303 has a software module and a device driver. The software module refers to various function modules that can execute the foregoing method of the present invention, and the device driver may be a network and interface driver.

Upon startup, these software components are loaded into the memory 303 and then are accessed by the processor 302 to execute the following instructions:

sharing specified content with a specified sharing user when a preset sharing condition is met, where the sharing condition is at least one of the following factors: a current time of the first terminal is a preset time; a current time of the first terminal falls within a preset time range; a current geographic location of the first terminal is a preset geographic location; or a current geographic location of the first terminal falls within a preset geographic location range.

This embodiment of the present invention provides an information sharing apparatus. A sharing condition such as a time or a geographic location is preset, and content is shared with a specified user according to the sharing condition, thereby simplifying complexity of sharing information in a future time period and improving usability of information sharing.

Persons skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. An information sharing method, comprising:
   receiving, by a first terminal, a sharing request from a second terminal at a first time of the first terminal;
   determining, by the first terminal, a preset sharing condition, content, and a specified sharing user according to the sharing request, wherein the preset sharing condition is not met at the first time;
   determining, by the first terminal, that the preset sharing condition according to the sharing request is met based on a current time of the first terminal and a current geographic location of the first terminal, wherein the current time of the first terminal is subsequent to the first time; and
   sharing, by the first terminal responsive to determining that the preset sharing condition according to the sharing request is met, the content with the specified sharing user, wherein the preset sharing condition is that the current time of the first terminal is a preset time or within a preset time range and the current geographic location of the first terminal is a preset geographic location or within a preset geographic location range.

2. The information sharing method according to claim 1, wherein the sharing the content with the specified sharing user comprises:
   sending, by the first terminal, the content with a specified generation time and the specified sharing user to a specified server when the preset sharing condition is met, so that the specified server sends the content with the specified generation time to the specified sharing user.

3. An information sharing apparatus, comprising:
   a network interface;
   a processor;
   a memory; and
   an application program physically stored in the memory, wherein the application program comprises instructions that, when executed by the processor, causes the processor to perform operations including:
   receiving a sharing request from a second terminal at a first time;
   determining a preset sharing condition, content, and a specified sharing user according to the sharing request, wherein the preset sharing condition is not met at the first time;
   determining that the preset sharing condition according to the sharing request is met based on a current time of the information sharing apparatus and a current geographic location of the information sharing apparatus, wherein the current time is subsequent to the first time; and
   sharing, responsive to determining that the preset sharing condition according to the sharing request is met, the content with the specified sharing user, wherein the preset sharing condition is that the current time of the information sharing apparatus is a preset time or within a preset time range and the current geographic location of the information sharing apparatus is a preset geographic location or within a preset geographic location range.

4. An information sharing method applied to a first terminal including a processor and a memory, the method comprising:
   receiving, by the first terminal, a sharing request from a second terminal at a first time;
   determining a preset sharing condition, content, and a specified sharing user according to the sharing request, wherein the preset sharing condition is not met at the first time;
   determining, by the first terminal, that the preset sharing condition according to the sharing request is met based on a current time of the first terminal and a current geographic location of the first terminal, wherein the current time of the first terminal is subsequent to the first time; and
   sharing, by the first terminal responsive to determining that the preset sharing condition according to the sharing request is met, the content with the specified sharing user, wherein the preset sharing condition is that the current time of the first terminal is a preset time or within a preset time range and the current geographic location of the first terminal is a preset geographic location or within a preset geographic location range.

* * * * *